(12) United States Patent
Amaanan

(10) Patent No.: US 12,503,064 B2
(45) Date of Patent: Dec. 23, 2025

(54) VEHICLE PROVIDED WITH A SOUND-DEADENING ELEMENT BETWEEN A FLOOR AND AN ELECTRIC BATTERY

(71) Applicant: RENAULT S.A.S, Boulogne Billancourt (FR)

(72) Inventor: Sofiane Amaanan, Guyancourt (FR)

(73) Assignee: AMPERE S.A.S., Boulogne Billancourt (FR)

( * ) Notice: Subject to any disclaimer, the term of this patent is extended or adjusted under 35 U.S.C. 154(b) by 332 days.

(21) Appl. No.: 18/245,953

(22) PCT Filed: Sep. 20, 2021

(86) PCT No.: PCT/EP2021/075829
§ 371 (c)(1),
(2) Date: Mar. 20, 2023

(87) PCT Pub. No.: WO2022/069285
PCT Pub. Date: Apr. 7, 2022

(65) Prior Publication Data
US 2023/0382319 A1    Nov. 30, 2023

(30) Foreign Application Priority Data

Sep. 30, 2020 (FR) .................................. 20 09951

(51) Int. Cl.
*B60R 13/08*    (2006.01)
*B60R 16/04*    (2006.01)

(52) U.S. Cl.
CPC .......... *B60R 13/0815* (2013.01); *B60R 16/04* (2013.01)

(58) Field of Classification Search
CPC ... B60R 13/0815; B60R 16/04; B32B 27/065; B32B 2266/0278; B32B 3/30; B32B 27/32; B32B 2307/102; B32B 2605/00; B32B 5/18; E04F 2290/041; B60K 2001/0438; B60K 1/04; B60Y 2200/91; B60Y 2306/09; Y02T 10/64; Y02T 10/70
See application file for complete search history.

(56) References Cited

U.S. PATENT DOCUMENTS

| | | | |
|---|---|---|---|
| 11,577,671 B2 * | 2/2023 | Schulze | B60R 13/0815 |
| 2008/0136110 A1 * | 6/2008 | He | B60K 1/04 |
| | | | 277/316 |
| 2020/0023793 A1 | 1/2020 | Schulze et al. | |

FOREIGN PATENT DOCUMENTS

| | | | | |
|---|---|---|---|---|
| CN | 115929825 A * | 4/2023 | | B60R 13/08 |
| DE | 10 2007 058 250 A1 | 6/2008 | | |

(Continued)

OTHER PUBLICATIONS

DE-102019119935-A1 English Translation (Year: 2021).*

(Continued)

*Primary Examiner* — Michael T. Walsh
(74) *Attorney, Agent, or Firm* — Oblon, McClelland, Maier & Neustadt, L.L.P.

(57) ABSTRACT

A vehicle includes a floor and an electric battery placed beneath the floor. The vehicle also includes a layer of sound-deadening foam inserted between the floor and the battery such that the layer has an upper surface that is in contact with the floor and a lower surface that is in contact with the battery. At least one the two surfaces forms at least a seal intended to increase the sound-deadening of the foam between the floor and the battery.

14 Claims, 2 Drawing Sheets

(56) References Cited

FOREIGN PATENT DOCUMENTS

| | | | | |
|---|---|---|---|---|
| DE | 102016213262 A1 | * | 1/2018 | ............... B60K 1/04 |
| DE | 102019002599 A1 | * | 10/2019 | ............... B60K 1/04 |
| DE | 102020203854 A1 | * | 12/2020 | ............... B60K 1/04 |
| DE | 102019119935 A1 | * | 1/2021 | ............. B62D 25/20 |
| EP | 3 318 401 A1 | | 5/2018 | |
| KR | 20130060677 A | * | 6/2013 | ....... B29C 66/91411 |
| RU | 11519 U1 | * | 10/1999 | |
| WO | WO 2020/136021 A1 | | 7/2020 | |

OTHER PUBLICATIONS

DE-102020203854-A1 English Translation (Year: 2020).*
DE-102019002599-A1 English Translation (Year: 2019).*
DE-102016213262-A1 English Translation (Year: 2018).*
RU-11519-U1 English Translation (Year: 1999).*
KR-20130060677-A English Translation (Year: 2013).*
CN-115929825-A English Translation (Year: 2023).*
International Search Report issued Nov. 22, 2021 in PCT/EP2021/075829 , filed on Sep. 20, 2021, 2 pages.
Preliminary French Search Report mailed on Apr. 23, 2021 in FR 2009951 filed on Sep. 30, 2020, 3 pages), with Translation of Category of Cited Documents.

* cited by examiner

000# VEHICLE PROVIDED WITH A SOUND-DEADENING ELEMENT BETWEEN A FLOOR AND AN ELECTRIC BATTERY

BACKGROUND

The present invention relates to a vehicle with a sound-deadening element between a floor and an electric battery.

To properly understand the positioning of the various parts involved in a vehicle according to the invention, the description is provided with reference to a direct orthonormal reference system XYZ related to said vehicle, in which X is a front-to-rear longitudinal axis of the vehicle, oriented toward the rear, Y is a transverse axis oriented toward the right of the vehicle, and Z is a vertical axis directed upward.

In some types of vehicles with an electric battery, a foam layer is inserted between a floor of the vehicle and said battery, which is placed under said floor. This foam layer acts as a sound-deadening element to limit the noise produced by the vibrations of the electric battery when the vehicle is in a driving phase.

Application DE102019002599 A1 describes a battery casing arrangement on a motor vehicle chassis. This arrangement, which allows the battery casing to be removed without damage, comprises a foam sound-deadening element placed between a floor and a battery cover. Sealing elements in the form of seals are positioned on the battery casing. However, one drawback of this type of arrangement is that it involves a large number of parts, resulting in a longer assembly time, more sources of error, and therefore significant additional costs.

BRIEF SUMMARY

A vehicle according to the invention has an arrangement involving a sound-deadening element inserted between the floor and an electric battery placed under said floor, obviating the drawbacks found in the prior art.

The invention relates to a vehicle comprising a floor and an electric battery placed under said floor, said vehicle further comprising a layer of sound-deadening foam inserted between the floor and said battery such that said layer has an upper surface that is in contact with the floor and a lower surface that is in contact with said battery.

According to the invention, at least one of said two surfaces forms at least one seal intended to increase the sound deadening of the foam inserted between the floor and the battery. Such a seal is an integral part of the sound-deadening foam and serves to increase the sound deadening performance of said foam, while providing a good seal between the foam and the floor, and/or between the foam and the electric battery. Said seal is used to improve the contact conditions between the foam and the floor and/or the battery. This seal can take any form, being for example constituted by a rib projecting from the surface on which the seal is placed, or being for example constituted by a groove hollowed out of said surface. It should be noted that at least one of the two surfaces of the foam can form a single seal or a plurality of independent seals. Advantageously, the foam extends over the entire surface of the floor. Preferably, the floor is rectangular, and the foam is also rectangular.

According to a possible feature of the invention, each of the two surfaces forms a seal. In this way, by virtue of the presence of a seal on each of the two surfaces of the foam, the latter is in close contact with both the floor and the battery. This significantly increases the sound deadening by the foam, compared to a foam without a seal, or a foam that forms a seal on only one of the two surfaces. Advantageously, the shape of the seals is identical on both surfaces of the foam. Preferably, each seal of one of the two surfaces is aligned vertically with a seal of the other surface.

According to a possible feature of the invention, the seal is constituted by a rib creating a bead projecting from the surface. Such a seal thus increases the size of the foam. When the foam is inserted between the floor and the battery, one of the seals tends to be compressed against a surface of said floor and the other seal tends to be compressed against a surface of the battery.

According to a possible feature of the invention, the cross section of the seal is rectangular, a long side L of this cross section embodying the width of the seal, and a short side I of this cross section corresponding to the height of the seal in relation to the surface of the foam from which said seal projects. The shape of this cross section is particularly suited to increasing the sound deadening of the foam in a vehicle according to the invention, but is by no means limited to this application.

According to a possible feature of the invention, the seal is embodied by a slot creating a groove in the surface of the foam from which said slot is hollowed out. The close contact between the foam and the floor and the battery is achieved by means of a negative pressure created in the groove between said foam and said floor and said battery. The foam is made more lightweight in this arrangement corresponding to removal of material.

According to a possible feature of the invention, the cross section of the groove forming the seal is rectangular. The shape of this cross section is particularly suited to increasing the sound deadening of the foam in a vehicle according to the invention, but is by no means limited to this application.

According to one possible feature of the invention, the seal extends over the entire periphery of the surface of the foam. In this type of arrangement, the seal for example passes over the side members, and is particularly effective in increasing the sound deadening of the foam. The periphery corresponding to the space between the outer edge delimiting the foam, and a notional inner edge having the same profile as said outer edge, but with smaller dimensions, the width of said space being less than 10 cm.

According to one possible feature of the invention, the seal forms a closed loop on the surface of the foam. This loop can be of any shape, for example square, rectangular, or circular.

According to a possible feature of the invention, the loop is rectangular. Specifically, since in many cases the foam is rectangular, it is desirable for the seal to form a rectangular loop to follow the contour of said foam.

According to a possible feature of the invention, the foam is made of polyurethane and has a polyethylene film. This example foam is particularly suited to a vehicle according to the invention, but is by no means limited to this application.

A vehicle according to the invention has the advantage of having a foam that is particularly effective in deadening sound between the floor and the electric battery by virtue of the judicious addition of a seal to the foam, requiring neither a change of foam nor the addition of cumbersome additional parts. Moreover, a vehicle according to the invention has the advantage of having a foam interposed between the floor and the electric battery, which performs a double function: ensuring improved sound deadening and providing a good seal with the floor and/or the electric battery.

BRIEF DESCRIPTION OF THE DRAWINGS

A detailed description of a preferred embodiment of a vehicle according to the invention is provided below with reference to the following figures.

DETAILED DESCRIPTION

Figure 1:
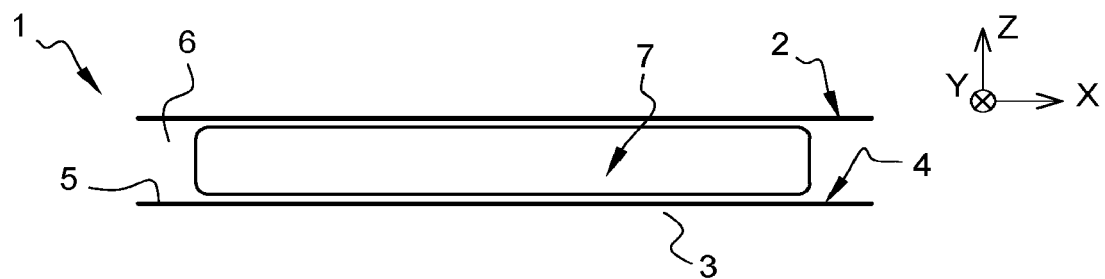
FIG. 1 is a side view in a plane XZ of a zone of a vehicle according to the prior art, comprising a floor, a sound-deadening foam, and an electric battery.

With reference to FIG. 1, a vehicle 1 according to the prior art comprises a floor 2 extending in a substantially horizontal plane XY when the vehicle is on horizontal ground, and an electric battery 3 housed in a casing 4. When the battery 3 is mounted in the vehicle, the casing 4 is located under the floor 2 and has a flat upper face 5 extending in a horizontal plane XY when the vehicle 1 is on horizontal ground. Between the floor 2 and the upper surface 5 of the casing 4, there is a gap 6 that is filled with a layer of foam 7, preferably made of polyurethane with a polyethylene film. The upper surface 5 of the casing 4 and the floor 2 have substantially the same dimensions in a horizontal plane XY, and the foam 7 fits between the floor 2 and said upper surface 5 over substantially the entire horizontal surface of these two elements 2, 5. It is advantageously assumed that the floor 2, the upper surface 5 of the casing 4 and the foam 7 have the same dimensions and are rectangular. This foam 7 is compressed between the floor 2 and the upper surface 5 of the casing 4, and serves to deaden all the sounds and noises emitted between said casing 4 and said floor 2 when the vehicle is in a driving phase. However, such a foam layer 7 in fact presents some minor deficiencies in terms of sound deadening.

Figure 2:
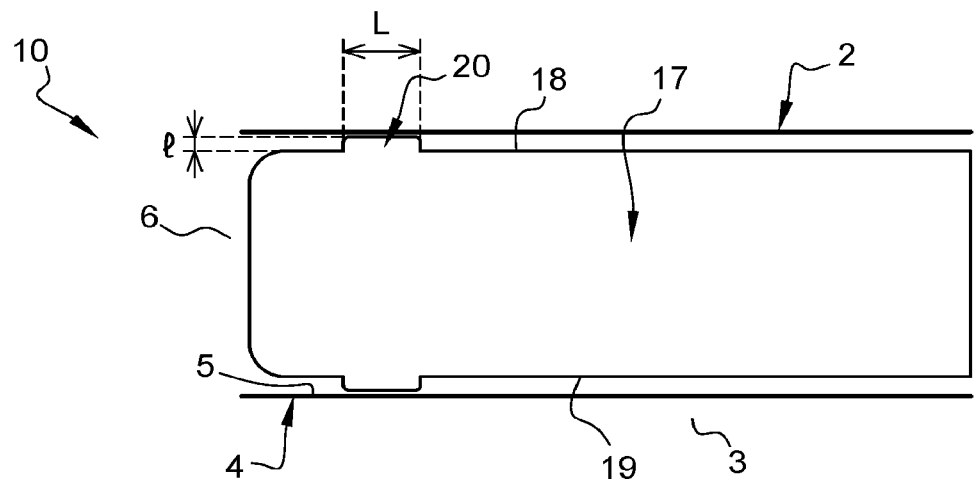
FIG. 2 is a magnified view of a portion of the zone in FIG. 1, showing the foam according to a first embodiment of a vehicle according to the invention.
Figure 3:
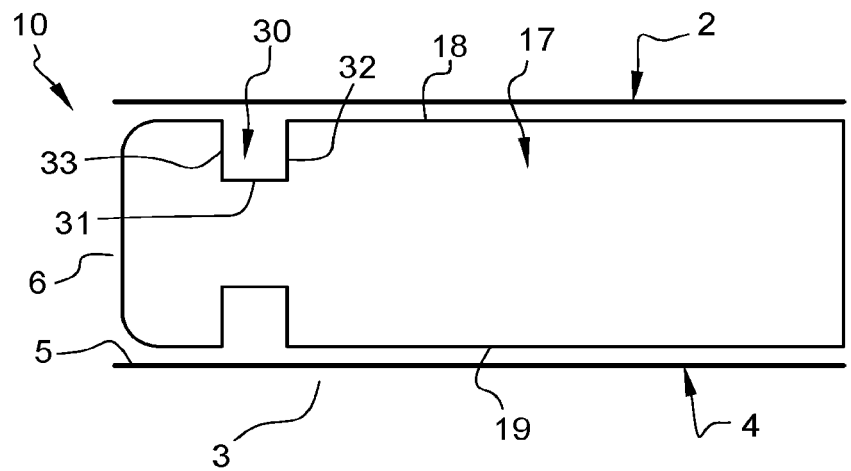
FIG. 3 is a magnified view of a portion of the zone in FIG. 1, showing the foam according to a second embodiment of a vehicle according to the invention.
Figure 4:
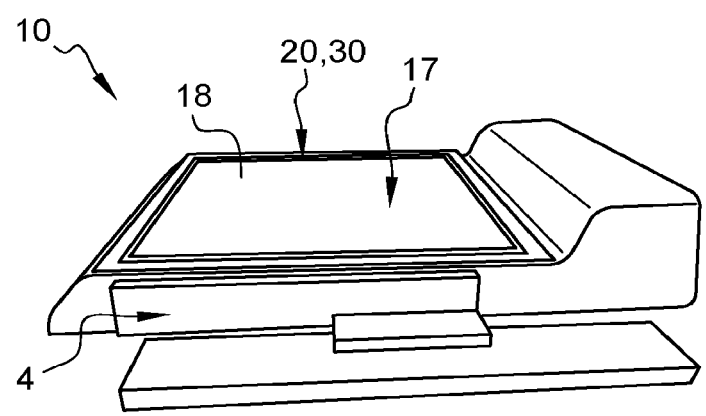
FIG. 4 is a perspective view of a foam of a vehicle according to the invention, showing a seal on an upper surface of said foam.

With reference to FIGS. 2, 3 and 4, a foam 17 of a vehicle 10 according to the invention has improved sound deadening properties, implementing at least one seal 20, 30 intended to be compressed against both the floor 2 and the upper surface 5 of the casing 4. The foam 17 has an upper surface 18 intended to come into contact with the floor 2 and a lower surface 19 intended to come into contact with the upper surface 5 of the casing 4, said two surfaces 18, 19 being parallel and extending horizontally when the vehicle 10 is on horizontal ground.

With reference to FIG. 2 and according to a first embodiment of a vehicle 10 according to the invention, the upper surface 18 and the lower surface 19 of the foam 17 each have a seal 20 in the form of a rib projecting from said surface 18, 19. The seal 20 of one surface 18, 19 and the seal 20 of the other surface 18, 19 project in two opposite directions along a vertical axis Z, and create an overthickness that tends to widen the foam layer 17. The seals 20 of the two surfaces 18, 19 are identical and have a rectangular cross section, a long side L of this cross section embodying the width of the seal 20 and a short side I of said cross section corresponding to the height of the seal 20, 30 in relation to the surface 18, 19 of the foam 17 on which said seal is placed.

With reference to FIG. 4, the seal 20 extends over the upper surface 18 or the lower surface 19, forming a rectangular closed loop. The dimensions of this rectangular loop are smaller than the dimensions of the two surfaces 18, 19 of the foam 17 from which the seal 20 projects. In this way, the seal 20 runs along the contour of the surface 18, 19 from which the seal projects, and therefore extends about the periphery of said surface 18, 19. The space between the contour of the surface 18, 19 and the seal 20 is less than 10 cm, and preferably less than 5 cm. In this first embodiment, the seal 20 is made of the same material as the foam 17 and advantageously the foam 17 and the seal 20 form a single part made by molding. According to a variant embodiment, the seal 20 is an attached part fastened to the foam 17.

In this first embodiment, when the foam 17 is inserted between the floor 2 and the upper surface 5 of the casing 4, said foam is compressed between these two elements and the seal 20 on the upper surface 18 is compressed against said floor 2 and the seal 20 on the lower surface 19 is compressed against said upper surface 5 of the housing 4. The seal 20 therefore helps to improve the sound-deadening properties of the foam 17, and to ensure a good seal between this foam 17 and the two elements constituted by the floor 2 and the upper surface 5 of the casing 4.

With reference to FIG. 3 and according to a second embodiment of a vehicle 10 according to the invention, the upper surface 18 and the lower surface 19 of the foam 17 each have a seal 30 in the form of a slot hollowed out of said surface 18, 19. The slot embodying the seal 30 in each surface 18, 19 is delimited by a bottom 31 and by two parallel side walls 32, 33, said two side walls 32, 33 being perpendicular to said bottom 31. The slot 30 in one surface 18, 19 and the slot 30 in the other surface 18, 19 are hollowed out along a vertical axis Z, so that the distance between the bottoms 31 of the two slots 30 is the minimum distance between said slots 30. The slots 30 in the two surfaces 18, 19 are identical and each have a rectangular cross section.

With reference to FIG. 4, the seal 30 extends over the upper surface 18 or the lower surface 19, forming a rectangular closed loop. The dimensions of this rectangular loop are smaller than the dimensions of the two surfaces 18, 19 of the foam 17 from which the slots 30 are hollowed out. In this way, the seal 30 runs along the contour of the surface 18, 19 from which the seal is hollowed out, and therefore extends about the periphery of said surface 18, 19. The space between the contour of the surface 18, 19 and the seal 30 is less than 10 cm, and preferably less than 5 cm.

For this second embodiment, when the foam 17 is inserted between the floor 2 and the upper surface 5 of the casing 4, said foam is compressed between these two elements 2, 5 and creates a negative pressure in the two slots embodying the seals 30. This negative pressure created in the seals 30 thus helps to improve the contact conditions between the foam 17 and the floor 2, and between the foam 17 and the upper surface 5 of the casing 4. These seals 30 therefore help to improve the sound-deadening properties of the foam 17, and to ensure a good seal between this foam 17 and the two elements constituted by the floor 2 and the upper surface 5 of the casing 4.

The invention claimed is:

1. A vehicle comprising:
  a floor;
  an electric battery placed under said floor; and
  a layer of sound-deadening foam inserted between the floor and said battery so that said layer has an upper surface that is in contact with the floor and a lower surface that is in contact with said battery, wherein at least one of said upper and lower surfaces forms at least one seal that is spaced inward from an outermost perimeter of the upper surface or the lower surface and the seal is configured to increase sound deadening of the foam inserted between the floor and the battery.

2. The vehicle as claimed in claim 1, wherein each of the upper and lower surfaces forms a seal.

3. The vehicle as claimed in claim 2, wherein the seal is a rib creating a bead projecting from the upper surface or the lower surface.

4. The vehicle as claimed in claim 3, wherein a cross section of the seal is rectangular, and a long side of the cross section is a width of the seal, and a short side of the cross section is a height of the seal in relation to the upper surface or the lower surface of the foam from which said seal projects.

5. The vehicle as claimed in claim 2, wherein the seal is a slot creating a groove in the upper surface or the lower surface of the foam from which said slot is hollowed out.

6. The vehicle as claimed in claim 5, wherein a cross section of the groove forming the seal is rectangular.

7. The vehicle as claimed in claim 1, wherein the seal extends over an entire periphery of the upper surface or the lower surface of the foam.

8. The vehicle as claimed in claim 7, wherein the seal forms a closed loop on the upper surface or the lower surface of the foam.

9. The vehicle as claimed in claim 8, wherein the loop is rectangular.

10. The vehicle as claimed in claim 1, wherein the foam is made of polyurethane and has a polyethylene film.

11. The vehicle as claimed in claim 1, wherein the upper surface includes planar portions radially inward and radially outward from the seal, and the seal is a rib that extends upward from the planar portions of the upper surface.

12. The vehicle as claimed in claim 1, wherein the lower surface includes planar portions radially inward and radially outward from the seal, and the seal is a rib that extends downward from the planar portions of the lower surface.

13. The vehicle as claimed in claim 1, wherein the upper surface includes planar portions radially inward and radially outward from the seal, and the seal is a groove that extends downward from the planar portions of the upper surface.

14. The vehicle as claimed in claim 1, wherein the lower surface includes planar portions radially inward and radially outward from the seal, and the seal is a groove that extends upward from the planar portions of the lower surface.

* * * * *